UNITED STATES PATENT OFFICE.

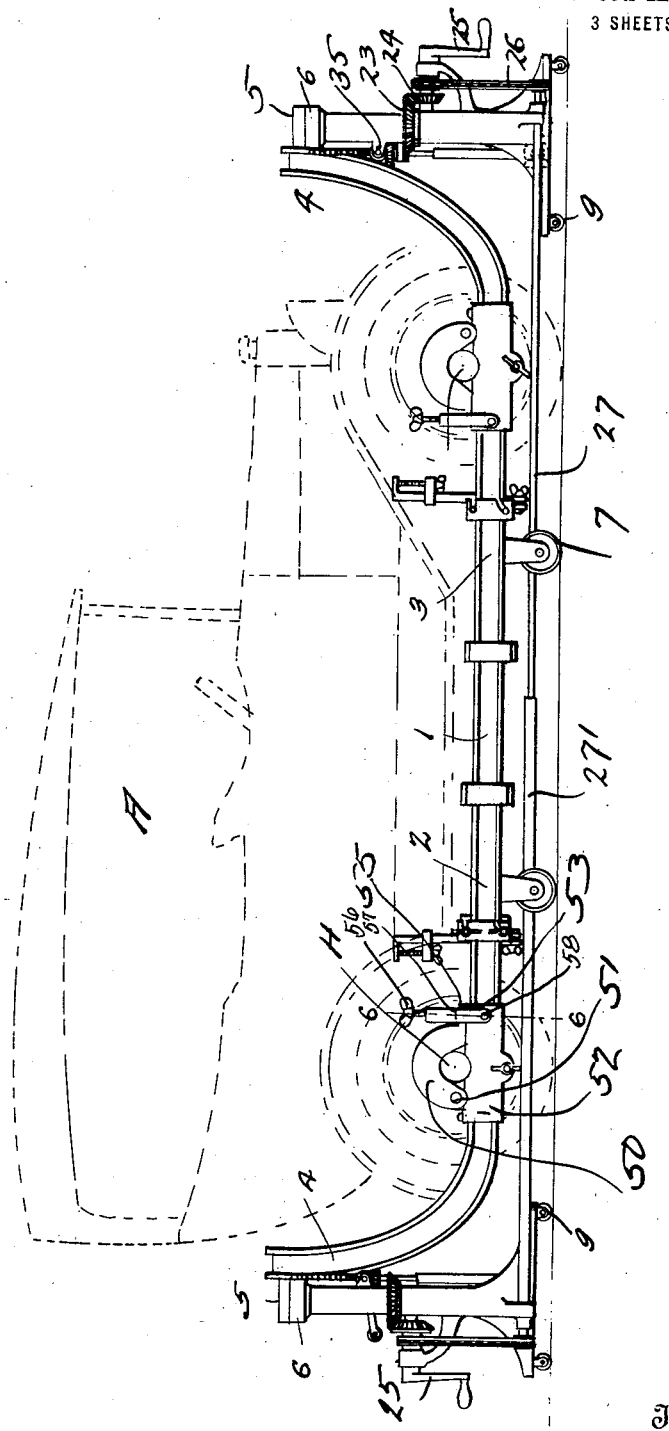

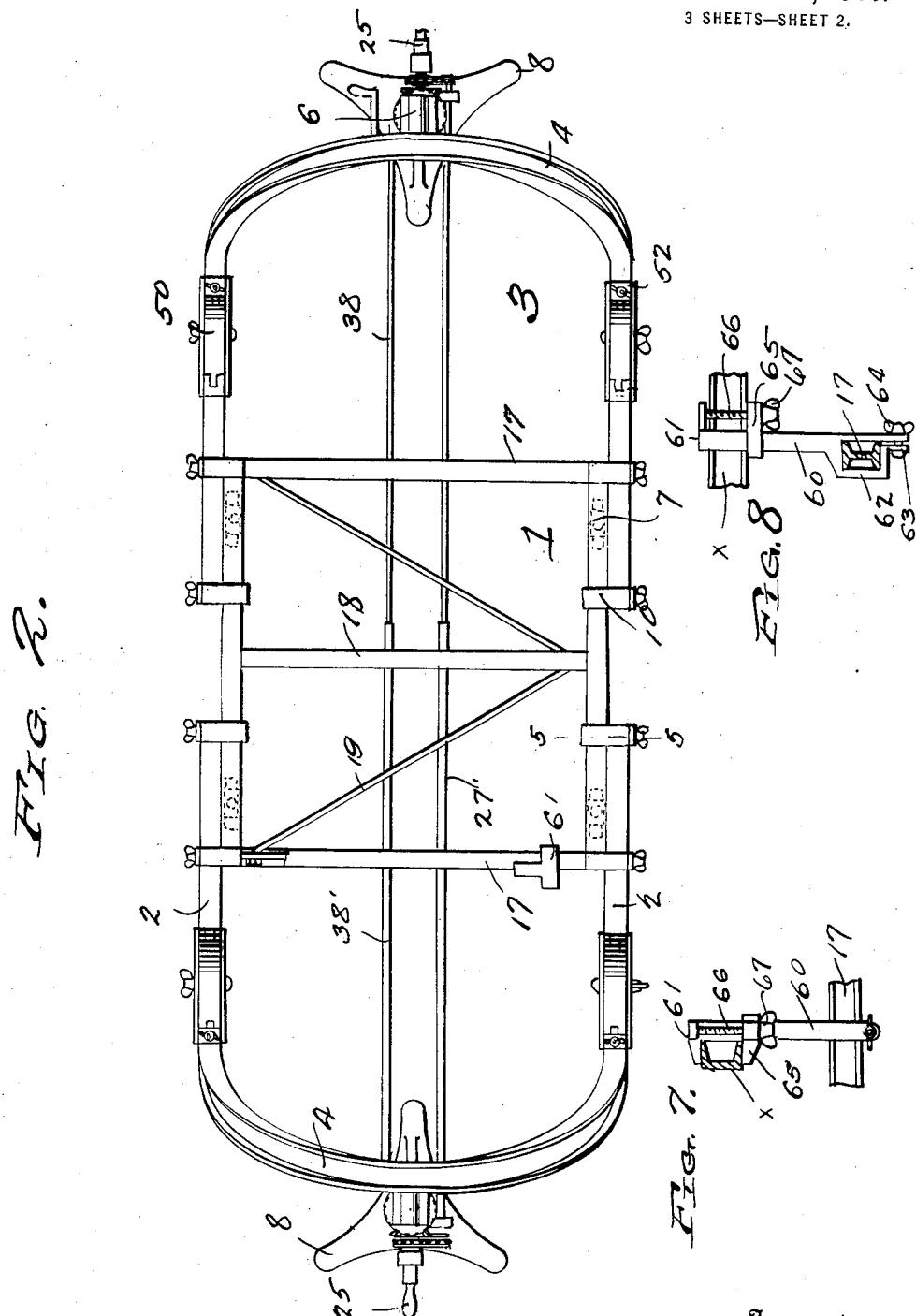

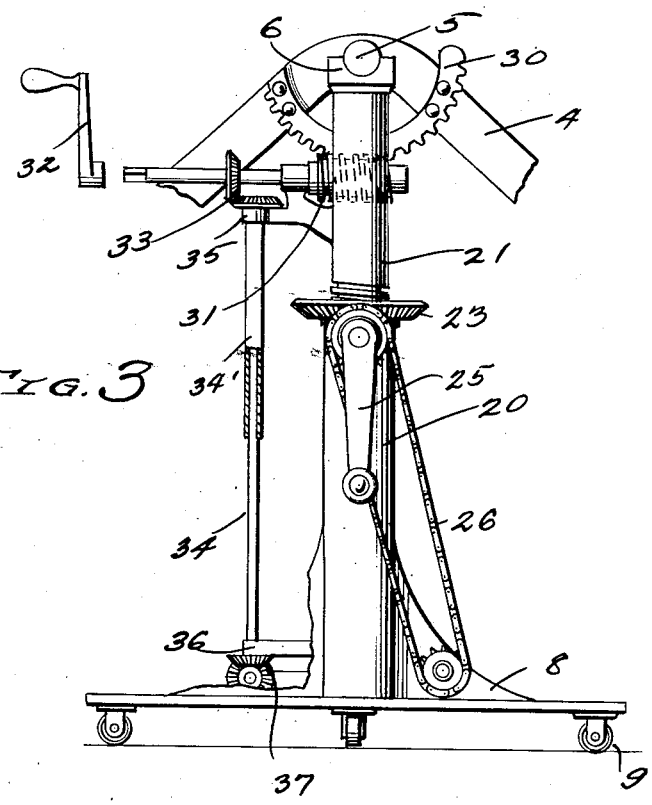
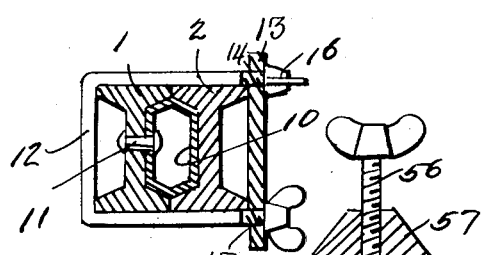
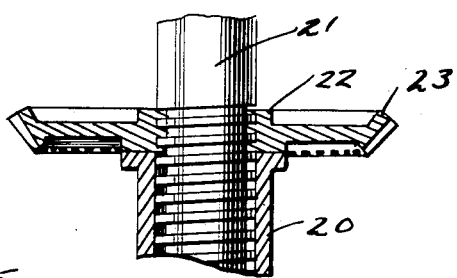
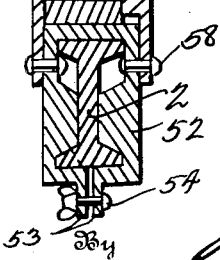

BRUCE B. BRADFORD, OF HOT SPRINGS, MONTANA.

AUTOMOBILE LIFTER AND TURNER.

1,332,599. Specification of Letters Patent. Patented Mar. 2, 1920.

Application filed April 16, 1919. Serial No. 290,423.

*To all whom it may concern:*

Be it known that I, BRUCE B. BRADFORD, a citizen of the United States, residing at Hot Springs, in the county of Sanders and State of Montana, have invented certain new and useful Improvements in Automobile Lifters and Turners, of which the following is a specification.

This invention relates to pushing and pulling implements, and more especially to vehicle body lifters employing swinging side bars; and the object of the same is to produce a jack or truck of this character which may be run under an automobile so that the latter may be lifted off the floor and turned aside for an inspection and repair of the mechanism at the bottom. I have noticed that in a large percentage of cases, the mechanic has to crawl under a motor vehicle and make repairs over his face, with the result that dirt and grease fall into his eyes and the posture is extremely uncomfortable. I propose to devise a jack or truck by means of which the motor vehicle can be lifted off the floor and then turned or tilted to one side so that repairing can be done more comfortably. The invention contemplates other features which will be brought out in the following specification and claims.

Referring to the drawings,

Figure 1 is a side view of this device complete, with the automobile shown in dotted lines.

Fig. 2 is a plan view of the structure alone.

Fig. 3 is an end elevation partly broken away.

Fig. 4 is a sectional detail of part of one of the jacks.

Fig. 5 is a sectional detail on the line 5—5 of Fig. 2, and Fig. 6 a sectional detail on the line 6—6 of Fig. 1, both taken on an enlarged scale.

Figs. 7 and 8 are elevations at right angles to each other, showing the details of a fastening device which may be employed to connect the frame of the automobile with this machine.

The framework consists of a cradle 1 and two yokes 2 and 3, each of which is upbent at its outer end as at 4 and carries a stub shaft 5 mounted in a bearing 6 at the top of one of the jacks. Each of these three elements is mounted on wheels of its own. Those of the cradle are numbered 7, and the base 8 of each jack is mounted on caster wheels 9. Therefore, when the machine is supported by this device, it can be moved about on the garage floor and at other times the entire truck can be moved aside into a corner out of the way. Thus the framework may be said to be mounted entirely on wheels, and also it is pivotally supported by the jacks.

For adapting the framework to machines of different lengths, the side bars of each yoke are made so that they pass outside of and are detachably connected with the side bars of the cradle. By preference, these members are of I-beams as seen in Fig. 5 where the beams of the side bars overlap each other. The numeral 10 designates an extension beam riveted or bolted at 11 to the side beam 1 of the cradle and shaped to fit between its side beam and that of the yoke, although it is quite obvious that the side beam of the cradle could be made of a section which would adapt it to fit more closely into the I-beam of the yoke. However, after these elements are adjusted one upon the other, they are clamped together by appropriate means. In Fig. 5 I have shown a clip consisting of a U-shaped element 12 embracing both side beams, a clip plate 13 having notches 14 and 15 for removable engagement with the ends of the element 12, which are threaded as shown, and thumb nuts 16 screwed onto said ends, capable of being tightened up to hold the parts in adjusted positions. Cross bars 17 connect the ends of the side bars of the cradle a cross bar 18 connects their mid-lengths, and oblique braces 19 may be employed for giving this element strength as shown in Fig. 2.

Each jack is composed of a standard 20 rising from its base 8, and a pillar or screw 21 whose threaded lower end passes down into the tubular standard as seen in Fig. 4, while its upper end carries the bearing 6. Engaging the threads is the hub 22 of a beveled gear 23, the hub resting on the upper end of the standard. This gear is engaged by another beveled gear 24 mounted on the shaft of a hand crank 25, and the said shaft carries a sprocket connected by a chain belt 26 with another sprocket on one extremity of a telescopic shaft 27. As seen in Fig. 1, the larger member 27' of this shaft extends to the other end of the machine, where the structure just described is duplicated. Therefore, by turning either hand crank 25 the screw or pillar element of each jack is caused to rise or descend at the will of the operator. This of course lifts the upbent ends 4 of the two yokes, and the yokes carry the cradle which latter has its wheels 7 lifted off the floor, so that the machine is sustained entirely by the caster wheels 9. Attention is invited to the fact that the upbent ends 4 which carry the shafts 5 dispose them near the center of gravity of the machine, in order to place it as nearly as possible on a perfect balance to permit tilting.

The tilting mechanism consists of a sector 30 secured to each upbent end 4 and having teeth struck on an arc below the axis of the stub shaft 5 as seen in Fig. 3, and a worm 31 engages these teeth and is fast on the shaft of a hand cranks 32. Said shaft is geared as at 33 to a telescopic shaft 34 whose larger element 34' is mounted in a bearing 35 carried by the screw 21, while the lower element 34 is mounted in a bearing 36 on the base. Gearing 37 connects the lower end of the lower element with a telescopic shaft 38 whose larger member 38' (see Fig. 2.) is connected with similar mechanism at the other end of the machine. Therefore, rotation of either hand crank 32 rotates the other simultaneously and the screws engaging the sectors cause the swinging of the yokes and the tilting of the cradle to one side or the other at the option of the operator. It will thus be seen that after the device is put under a machine, the same can be lifted off the floor and then swung to one side or the other to gain access to the machinery at the bottom.

In the use of this device, its three elements 1, 2 and 3 are separated from each other, the cradle is first moved transversely of the midlength of the machine, then the two yokes are put endwise under the ends of the machine and the two elements of the two telescopic shafts connected. Finally, the fastening devices shown in Fig. 5 are connected up so that the parts stand with respect to the machine about as seen in Fig. 1. Now the cranks, either or both of them numbered 25, are rotated so that the jacks raise the framework, and then either or both of the cranks 32 are rotated to tilt the machine with the result above described. Even while it is in this raised and tilted position, the machine can be moved about the garage floor for the purpose of getting better light, etc. After the work is done, a reversal of the operation restores the parts to their original position, and the invention can be drawn from beneath the machine and stored in a small space.

As will be seen in Fig. 1, the side bars of the yokes pass outside the wheels and under the hubs H of the automobile A; and if such hubs project, holding means may be employed to fasten each hub down onto its side bar so that the machine will not tip off the framework when the latter is tilted to one side. While any suitable means may answer, I prefer to use the mechanism illustrated in side view in Fig. 1 and in sectional detail in Fig. 6. That is to say, the number 50 designates a curved latch, one end being pivoted at 51 to a base 52 which is slidably mounted on the side beam 2 of the yoke. This base may be a clip inclosing said beam and having ears 53 at its lower end capable of being drawn together by a thumb screw 54, although the base will hardly slip on the side beam after tension is applied as will be presently described. The other or free end of the latch 50 has a lip 55 adapted to be borne down onto the base 52 by a set screw 56 pressed downward through a yoke 57 which is pivoted at 58 to the base 52 and may swing aside. When so swung aside, the latch 50 may be raised, and if the set-screw 54 is loosened at this time the base can be adjusted along the side bar 2 of the yoke to bring the device opposite a hub H no matter where it is located. Then the latch is swung over and the yoke 57 raised, and finally its set screw is brought down onto the lip 55 in a manner which will be clear from this description.

Another means for holding the automobile on the structure is illustrated in detail in Figs. 7 and 8 in which I have employed the letter X to designate one of the beams in the chassis of the automobile and the number 17 to designate one of the cross bars in my structure, although it might be the intermediate cross bar in which case it would be that elsewhere referred to as 18. An upright body 60 has a fixed jaw 61 at its upper end and an offset or base 62 at its lower end loosely embracing the member 17, beneath which base ears 63 are capable of being drawn toward each other by a thumb screw 64 to clamp the base around the member. A movable jaw 65 is adjustable on the body by means of a screw 66 and thumb nut 67, and therefore the fixed jaw 61 can be passed over an element X in the chassis and the movable jaw 65 brought up against the under side of the same and clamped against it by turning the thumb nut 67. The entire fastening element can be adjusted on the element 17 and held in place by means of the thumb screw 64. I have shown one of these devices in Fig. 2, although it will be understood that they may be mounted at various points on the cross bars or even on the side bars of the structure for attaching the chassis of the automobile thereto. When the machine is jacked up off the floor and tilted toward one side or the other, these devices throw the strain onto the chassis direct, instead of through the springs as would be the case if the machine were fastened to the structure only by the latches 50 engaging the hubs. Of course it would be wise to employ all clamps possible, and this accounts for their provision herein at various places and their adjustment so as to adapt them to different machines.

The foregoing description and the drawings have reference to what may be considered the preferred, or approved form of my invention. It is to be understood that I may make such changes in construction and arrangement and combination of parts, dimensions, et cetera, as may prove expedient and fall within the scope of the appended claims.

Having thus fully described my invention, what I claim as new and desire to secure by Letters Patent is:—

1. In an automobile lifter, the combination with a pair of jacks, each mounted on a base supported on wheels and having a bearing at its upper end; of a pair of yokes upbent at their outer ends and having stub shafts engaging said bearings, a cradle whose side bars lap the arms of and intervene between said yokes, and clamps for connecting said side bars and arms, as described.

2. In an automobile lifter, the combination with a pair of jacks mounted on wheels, a pillar on each jack, and crank mechanism for raising the pillar; of a pair of yokes upbent at their outer ends and pivoted respectively in said pillars, means for adjustably connecting the pillars with each other, and longitudinally adjustable connecting means between the actuating mechanisms of said jacks.

3. In an automobile lifter, the combination with a pair of jacks, mounted on wheels, a pillar on each jack, and crank mechanism for raising the pillar of each jack; of a pair of yokes upbent at their outer ends and pivoted respectively in said pillars, means for adjustably connecting pillars with each other, and means for swinging the yokes from side to side on their pivotal supports.

4. An automobile lifter including jacks, telescopically connected yokes carried by the jacks and adapted to receive the automobile, and mechanism to swing said yokes on the jacks.

5. An automobile lifter and turner including jacks arranged fore and aft of the automobile and equipped with mechanism to embrace the latter, means to simultaneously operate the jacks for raising and lowering said mechanism, and means to impart lateral movement to said mechanism for swinging the automobile from side to side.

6. In an automobile lifter and turner, the combination with a pair of independent jacks mounted on caster wheels, a pair of yokes having upbent outer ends, stub-shafts on said ends projecting outwardly, bearings on said jacks in which said stub-shafts are mounted, lifting mechanism in the jacks, connections between the two mechanisms, swinging mechanisms connected with said upbent ends, and connections between the two mechanisms; of a cradle the sides of which lap the sides of said yokes, detachable and adjustable fastening devices between said cradle and yoke sides, latches carried by said yokes and engageable with the hubs of the automobile to secure the latter.

7. In an automobile lifter and turner, the combination with a framework, means for rendering it longitudinally adjustable, jacks connected with its ends for elevating the framework, and means also connected with said ends for swinging the framework when it is elevated; of latches, each comprising a base adjustably mounted on the said framework, a body, hinge connections between one end of the body and the base, a lip at the other end of the body overlying the base, a yoke on the base, and a screw passing down through said yoke onto the lip, for the purpose set forth.

8. In an automobile lifter and turner, the combination with a framework upbent at its ends, jacks in which said ends are pivotally mounted, means for actuating the jacks in unison, and means for tilting the framework to either side; of cross bars fastened within the framework, and on certain of said bars a fastening device comprising a base adjustably embracing said bar, ears at its lower end, a set screw through them for clamping the base on the bar, a body rising from the base and having a fixed jaw, the same for engagement over the automobile chassis, and a movable jaw on said body coacting with the fixed jaw.

In testimony whereof I affix my signature in presence of two witnesses.

BRUCE B. BRADFORD.

Witnesses:
    WALTER T. GUTZ,
    J. D. VEACH.